115,303

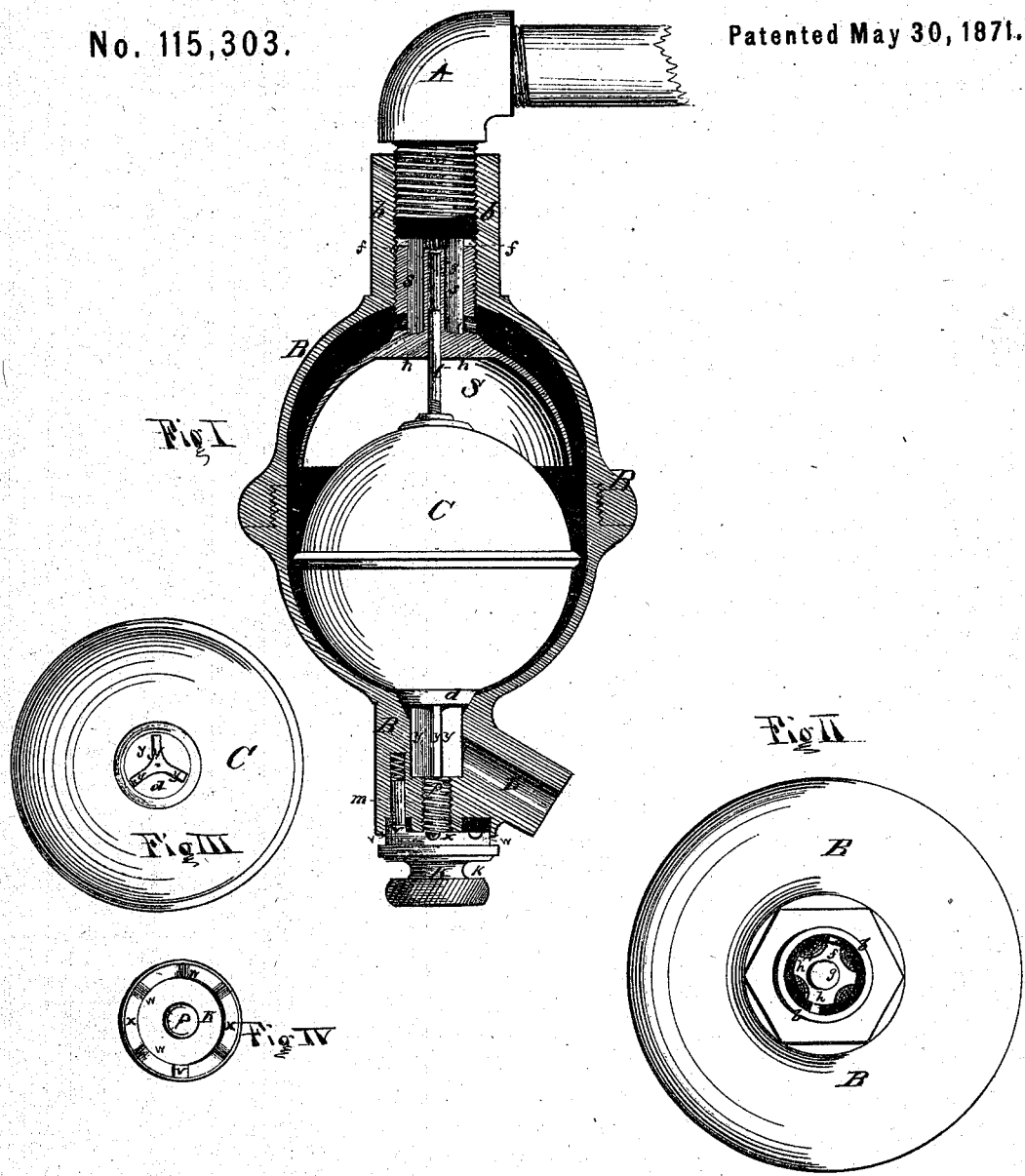

UNITED STATES PATENT OFFICE.

ISAAC E. GIDDINGS, OF SPRINGFIELD, MASSACHUSETTS.

IMPROVEMENT IN STEAM-TRAPS.

Specification forming part of Letters Patent No. 115,303, dated May 30, 1871.

I, ISAAC E. GIDDINGS, of Springfield, Hampden county, State of Massachusetts, have invented an Improvement in Steam-Traps, of which the following is a specification:

Nature and Objects of the Invention.

My invention relates to the construction of a trap of a hollow globular case containing within it a spherical float-valve; and it consists in the combination, with the above, of the device for raising at will the valve a greater or lesser distance above its seat, and holding it so raised as long as may be desired, the object of the invention being to enable a small quantity of water insufficient to float the valve to drip away, and thus obviate all risk of the trap being incapacitated by freezing.

Description of the Accompanying Drawing.

Figure I is a side sectional view; Fig. II, a top-plan view; and Figs. III and IV, detail views of parts of my invention.

General Description.

In the drawing, A is the pipe connecting the trap directly to the steam-cylinder, heating apparatus, or whatever it is used in connection with to permit the condensed steam to escape from. This pipe is screwed into the neck $b$ of the case B of the trap, which neck $b$ I form hexagonal or square for the purpose of enabling the trap to be readily attached to or removed from the pipe. Immediately beneath the supply-pipe A, in the neck $b$, is the shield S, constructed and arranged as follows: Surmounting a hemispherical cup, large enough within to permit the float C to raise within it, and leaving a space between its outside surface and the side of the case B for a water-passage, is the neck $s$, sleeved into the neck $b$ by a female screw, and having on its top recesses $f f$ for the reception of the screw-driver for operating it. This neck $s$, into which the water proceeds from the pipe A, has two or more ports, $h h$, at its bottom, to conduct the water to the space above the shield S. This is shown in Fig. 1, where it is seen that the stem of the float-valve rises through the bottom of neck $s$, and is prevented by the tube $g$ (closed at top) from having any lateral play while permitted to ascend when floated by the water. The float I prefer to make of some sheet metal not easily corroded, and strengthened by the valve-stem $t$ traversing it, being held at the top by a nut screwed against the top of the float and holding the disk $d$, from which the stem $t$ proceeds, fast against the bottom of the float. Stock is removed from the case B to make a tight valve-seat, and a recess is made beneath it sufficiently large to permit an ample egress of water, which flows off through the waste-pipe L. Beneath disk $d$ are two or more flanges, $y y$, set radially, to fill up the recess beneath the valve and insure the floats rising vertically while permitting the water to escape. Let into the lower end of the trap, and coming against the lower end of flanges $y y$, &c., is the screw $p$, rising from a thumb-nut, $k$. From the upper edge of this nut proceeds also a rim, $x$, surrounding the screw $p$, and being received into a corresponding groove in the bottom of the trap. The face of this rim $x$ has at regular intervals small depressions $w$ in it, and a projection or shoulder, $v$, rising from it, the objects of which are as follows: Opposite the rim is a small pin, $m$, contained within a hole in the bottom of the trap, and kept, by a small spring at its upper end, constantly pressing against the rim, so that, when the nut and screw are revolved, the pin $m$ is pushed into the first depression in the rim coming opposite its end, which is done with sufficient force to mark clearly the degree of revolution given to the screw, while offering only a slight resistance to the nut being further turned; but when the projection $v$ comes against the pin the revolution is stopped, and the nut can only make one either way, either to raise the valve off of its seat to the utmost or to leave it perfectly tight in its seat, so that in winter, when the trap is used in an exposed position, it may be so arranged that a constant drip can be taking place and the chances of freezing entirely done away with, while in summer it can be kept all the time closed. In the trap thus described I have one sensitive to the smallest amount of water, while perfectly steam-tight, and one in which the valve relieves itself while the pressure of steam is upon it.

Claim.

What I claim is—

The case B, float-valve C, shield S, in combination with the screw $p$, nut $k$ with rim $x$, and pin $m$ with its spring, the parts being constructed and arranged substantially as shown and described.

ISAAC E. GIDDINGS.

Witnesses:
JOHN M. STEBBINS,
R. F. HYDE.